(12) United States Patent
Kim

(10) Patent No.: US 9,834,084 B2
(45) Date of Patent: Dec. 5, 2017

(54) VEHICLE CONTROL METHOD FOR ENERGY RECOVERY

(71) Applicant: Hyundai Motor Company, Seoul (KR)

(72) Inventor: Sang Joon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/922,134

(22) Filed: Oct. 24, 2015

(65) Prior Publication Data

US 2017/0015188 A1 Jan. 19, 2017

(30) Foreign Application Priority Data

Jul. 13, 2015 (KR) .................. 10-2015-0099198

(51) Int. Cl.
| | |
|---|---|
| *B60K 6/442* | (2007.10) |
| *B60K 5/02* | (2006.01) |
| *B60K 6/448* | (2007.10) |
| *B60K 6/485* | (2007.10) |
| *B60W 30/18* | (2012.01) |

(52) U.S. Cl.
CPC .......... *B60K 6/442* (2013.01); *B60K 5/02* (2013.01); *B60K 6/448* (2013.01); *B60K 6/485* (2013.01); *B60W 30/18127* (2013.01); *B60W 2510/081* (2013.01); *B60W 2710/083* (2013.01);
(Continued)

(58) Field of Classification Search
CPC ... B60K 6/00; B60K 6/20; B60K 6/22; B60K 6/26; B60K 6/42; B60K 6/44; B60K 6/46; B60K 2006/268; Y10S 903/902; Y10S 903/904; Y10S 903/906; Y10S 903/93; B60W 20/00; B60W 20/10; B60W 20/11; B60W 20/14; B60W 20/15; B60W 30/18; B60W 30/18009; B60W 30/18127;
(Continued)

(56) References Cited

U.S. PATENT DOCUMENTS

| 5,549,371 A * | 8/1996 | Konaga ................. B60L 3/10 |
|---|---|---|
| | | 188/158 |
| 5,789,882 A * | 8/1998 | Ibaraki .................. B60K 6/48 |
| | | 180/65.25 |

(Continued)

FOREIGN PATENT DOCUMENTS

| JP | 2001-346302 A | 12/2001 |
|---|---|---|
| JP | 4232789 B2 | 3/2009 |
| KR | 10-2008-0011892 A | 2/2008 |

*Primary Examiner* — Thomas G Black
*Assistant Examiner* — Sara J Lewandroski
(74) *Attorney, Agent, or Firm* — Mintz Levin Cohn Ferris Glovsky and Popeo, P.C.; Peter F. Corless

(57) ABSTRACT

A hybrid vehicle control method is provided, in which a drive motor and an engine generate power and a hybrid starter generator connected to the engine generates electric power. The vehicle control method includes determining whether the vehicle is in a regenerative control mode and selecting a regenerative torque for the hybrid starter generator connected to the engine. The selected regenerative torque is applied to the hybrid starter generator and electric power is generated with the regenerative torque selected by the hybrid starter generator. In the regenerative torque selection, the regenerative torque with which maximum regenerative energy is produced is selected based on regenerative torque selection factors including a hybrid starter generator rotation speed.

18 Claims, 4 Drawing Sheets

(52) U.S. Cl.
CPC ............ *Y02T 10/84* (2013.01); *Y10S 903/905* (2013.01); *Y10S 903/906* (2013.01); *Y10S 903/93* (2013.01)

(58) Field of Classification Search
CPC ..... B60W 30/1882; B60W 2030/1809; B60W 30/18136; B60W 30/182; B60W 30/188
See application file for complete search history.

(56) References Cited

U.S. PATENT DOCUMENTS

| | | | | |
|---|---|---|---|---|
| 9,242,640 | B2* | 1/2016 | Tagawa | B60W 10/06 |
| 2002/0024306 | A1* | 2/2002 | Imai | B60K 6/442 |
| | | | | 318/34 |
| 2002/0117339 | A1* | 8/2002 | Nakashima | B60K 6/48 |
| | | | | 180/65.25 |
| 2007/0107958 | A1* | 5/2007 | Oliver | B60K 6/12 |
| | | | | 180/65.27 |
| 2014/0052364 | A1* | 2/2014 | Kim | F02N 11/0803 |
| | | | | 701/113 |
| 2015/0066266 | A1* | 3/2015 | Aldrich, III | B60L 7/18 |
| | | | | 701/22 |
| 2015/0291059 | A1* | 10/2015 | Kawasaki | B60W 20/00 |
| | | | | 701/22 |
| 2016/0121874 | A1* | 5/2016 | Muto | B60W 20/10 |
| | | | | 701/22 |
| 2016/0144850 | A1* | 5/2016 | Debert | B60K 6/48 |
| | | | | 701/22 |

* cited by examiner

VEHICLE CONTROL METHOD FOR ENERGY RECOVERY

CROSS-REFERENCE TO RELATED APPLICATION

This application claims priority to and the benefit of Korean Patent Application No. 10-2015-0099198 filed in the Korean Intellectual Property Office on Jul. 13, 2015, the entire contents of which are incorporated herein by reference.

BACKGROUND (a) Field of the Invention

The present invention relates to a vehicle control method and system, and more particularly, to a vehicle control method and system for energy recovery.

(b) Description of the Related Art

An electric-powered vehicle refers to a vehicle that uses a drive motor to receive power from a battery and to produce the vehicle driving force using the supplied power. The electric-powered vehicle includes an electric vehicle that uses a drive motor to produce any driving force for the vehicle or a hybrid vehicle that uses a drive motor to produce part of the driving force for the vehicle. The hybrid vehicle includes a drive motor driven by electricity and an engine that produces a driving force by fuel combustion, and the engine transmits the driving force to a drive shaft by being selectively connected to the drive shaft. When the engine and the drive shaft are disconnected, the engine may stop.

The above information disclosed in this section is merely for enhancement of understanding of the background of the invention and therefore it may contain information that does not form the prior art that is already known in this country to a person of ordinary skill in the art.

SUMMARY

The present invention provides a vehicle control method and system that are capable of producing electricity using inertia of an engine separated from a drive shaft and reducing vibration generated when the engine stops.

An exemplary embodiment of the present invention provides a hybrid vehicle control method in which a drive motor and an engine generate power and a hybrid starter generator connected to the engine generates electric power, the method may include: determining whether the vehicle is in a regenerative control mode; selecting a regenerative torque for the hybrid starter generator connected to the engine; applying the selected regenerative torque to the hybrid starter generator; and generating electric power with the regenerative torque by the hybrid starter generator. In the regenerative torque selection, the regenerative torque with which maximum regenerative energy is produced may be selected based on regenerative torque selection factors including a hybrid starter generator rotation speed.

The regenerative torque selection factors may further include vehicle speed, and the regenerative torque may be selected based on the hybrid starter generator rotation speed and the vehicle speed. Additionally, the regenerative torque may increase as the vehicle speed increases. The hybrid starter generator rotation speed may be proportional to the rotation speed of the engine. The regenerative torque selection may be performed based on at least one regenerative energy map with the regenerative torque selected based on the regenerative torque selection factors.

The vehicle control method may further include identifying the driving mode of the vehicle, and the regenerative torque selection may be performed based on a plurality of regenerative energy maps that correspond to a plurality of driving modes. Additionally, the vehicle control method may include comparing the revolutions per minute (RPM) of the engine or hybrid starter generator with a reference RPM, and when the RPM of the engine or hybrid starter generator is greater than the reference RPM, the regenerative torque selection and the regenerative torque application may be repeated.

The application of the regenerative torque to the hybrid starter generator may include: applying a newly selected second regenerative torque, which is different from a first regenerative torque, to the hybrid starter generator that generates electric power with the first regenerative torque; and changing the torque applied to the hybrid starter generator from the first regenerative torque to the second regenerative torque. In the changing of the regenerative torque from the first regenerative torque to the second regenerative torque, the torque applied to the hybrid starter generator may change linearly. Further, the determination of whether the vehicle is in the regenerative control mode may include determining whether the engine is separated from a drive shaft.

The vehicle control method according to the exemplary embodiment of the present invention offers the advantage of optimizing energy efficiency by generating electric power using the inertia of the engine, selecting the regenerative torque that enables the hybrid starter generator to produce maximum energy, and applying the regenerative torque to the hybrid starter generator.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
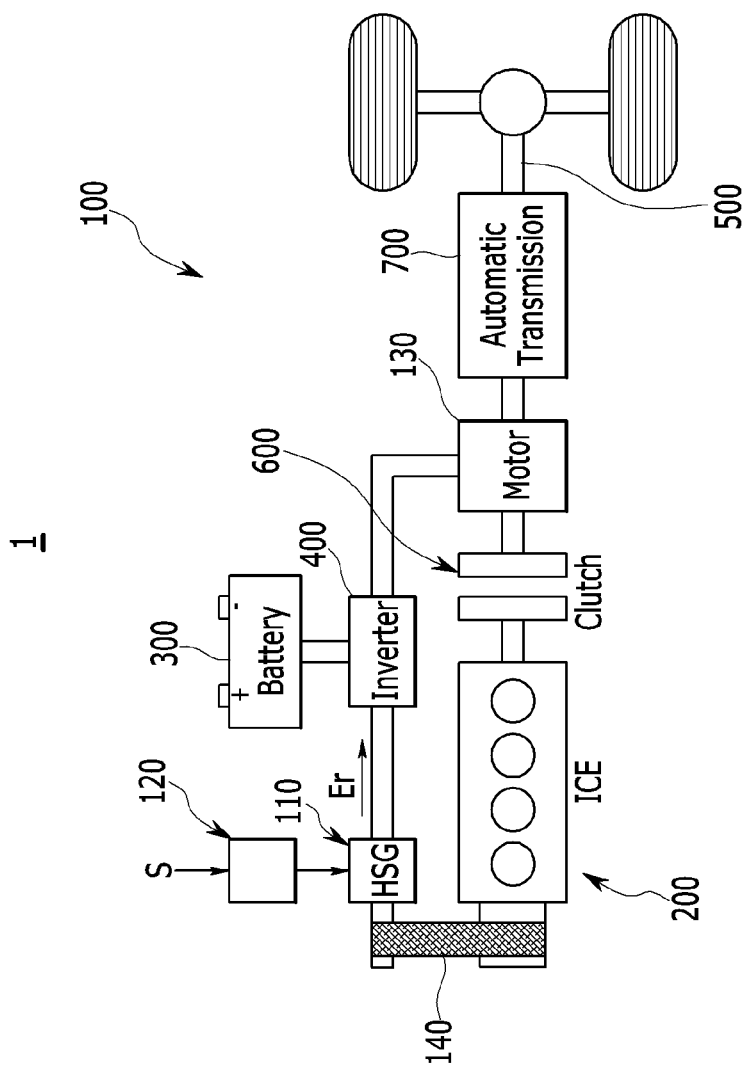
FIG. 1 is a block diagram showing the configuration of a vehicle driving system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. In the present invention, the term "on" implies being positioned above or below a target element, and does not imply being necessarily positioned on the top on the basis of a gravity direction.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, exemplary embodiments of the present invention have been shown and described, simply by way of illustration. As those skilled in the art would realize, the described exemplary embodiments may be modified in various different ways, all without departing from the spirit or scope of the present invention. The drawings and description are to be regarded as illustrative in nature and not restrictive. Like reference numerals designate like elements throughout the specification. Because the size and thickness of each element shown in the drawings are arbitrarily shown for better understanding and ease of description, the present invention is not limited thereto.

Hereinafter, a vehicle driving system and a control method thereof according to exemplary embodiments of the present invention will be described in detail with reference to the drawings.

FIG. 1 is a block diagram showing the configuration of a vehicle driving system according to an exemplary embodiment of the present invention. Referring to FIG. 1, a vehicle 1 equipped with a vehicle driving system 100 according to the present exemplary embodiment may include an engine 200 and a drive motor 130 as power sources.

A driving force generated from the engine 200 and/or the drive motor 130 may be transmitted to a drive shaft 500 through a transmission 700. The drive motor 130 may be connected to the transmission 700 to transmit the driving force generated from the drive motor 130 to the drive shaft 500. In addition, a plurality of clutches 600 may be interposed between the engine 200 and the drive motor 130, and the clutches 600 may selectively connect the engine 200 and the drive motor 130. Accordingly, the driving force generated from the engine 200 may be transmitted to the drive shaft 500 through the transmission 700 when the clutches 600 are engaged.

The vehicle driving system 100 may further include a battery 300, an inverter 400, and a hybrid starter and generator 110. The battery 300 may be connected to the drive motor 130 and the hybrid starter generator (HSG) 110 through the inverter 400, and may be configured to supply power to the drive motor 130 and the HSG 110. The inverter 400 may be configured to convert direct current (DC) power from the battery 300 to alternating current (AC) power to selectively supply the AC power to the drive motor 130 and the HSG 110.

The HSG 110 may be electrically connected to the inverter 400, and may be mechanically connected to the engine 200 via a belt unit 140. The HSG 110 may be configured to start the engine 200 using the power of the battery 300, or generate electric power by the inertia of the engine 200 when the engine slows down or stops, and store the generated electric power in the battery 300. The vehicle driving system 100 according to the present exemplary embodiment may be configured to generate electric power using a torque generated by the inertia of the engine 200 disconnected from the drive shaft 500. Accordingly, the vehicle driving system 100 may include a controller 120 configured to operate the HSG 110, the inverter 400, and the drive motor 130.

The controller 120 may be implemented by one or more microprocessors that operate by a preset program, and the preset program may include a series of commands for performing each step of a method according to an exemplary embodiment of the present invention to be described later. In particular, the controller 120 may be configured to calculate the regenerative torque T to be applied to the HSG 110, and may adjust the current such that a proper amount of current is applied to the HSG 110 based on the regenerative torque T. Therefore, the engine 200 connected to the HSG 110 stops, during which the HSG 110 generates electric power, i.e., regenerative energy Er, as it rotates with the engine 200 by the inertia of the engine 200.

Figure 2:
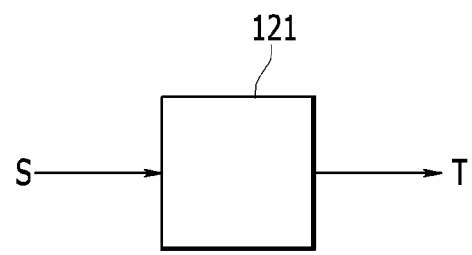
FIG. 2 is a view showing a process of generating a hybrid starter generator torque in the vehicle driving system of FIG. 1 according to an exemplary embodiment of the present invention.

Hereinafter, a process in which the controller 120 calculates regenerative torque T will be described in detail. FIG. 2 is a view showing a process of generating a hybrid starter generator torque in the vehicle driving system of FIG. 1. Referring to FIG. 2, the controller 120 may include a selection unit 121 configured to calculate regenerative torque T, and the selection unit 121 may be configured to select the regenerative torque at which maximum regenerative energy is produced, based on regenerative torque selection factors including HSG rotation speed S.

Hereinafter, a regenerative energy map exemplifying HSG rotation speed S, regenerative torque T, and regenerative energy produced with the rotation speed S and the regenerative torque T will be explained.

TABLE 1

|  | 500 rpm | 1000 rpm | 2000 rpm | 4000 rpm | 6000 rpm | 8000 rpm | 10,000 rpm | 12,000 rpm |
|---|---|---|---|---|---|---|---|---|
| 0 Nm | 0 J | 0 J | 0 J | 0 J | 0 J | 0 J | 0 J | 0 J |
| −5 Nm | 209 J | 428 J | 914 J | 1862 J | 2821 J | 3765 J | 4612 J | 5403 J |
| −10 Nm | 366 J | 800 J | 1,801 J | 3,807 J | 5,817 J | 7798 J (Max) | 9528 J (Max) | 11,056 J (Max) |
| −15 Nm | 510 J | 1126 J | 2638 J | 5679 J | 8735 J (Max) |  |  |  |
| −20 Nm | 628 J | 1372 J | 3401 J | 7497 J (Max) |  |  |  |  |
| −25 Nm | 654 J | 1563 J | 4104 J |  |  |  |  |  |
| −30 Nm | 707 J (Max) | 1,636 J (Max) | 4,686 J |  |  |  |  |  |
| −35 Nm | 641 J | 1561 J | 5,116 J (Max) |  |  |  |  |  |
| −35.3 Nm | 610 J | 1497 J | 5086 J |  |  |  |  |  |

Referring to Table 1, the horizontal axis indicates the rotation speed of the HSG 110, and the vertical axis indicates regenerative torque T. Additionally, Table 1 shows the regenerative energy ER that corresponds to each value of HSG rotation speed and each value of regenerative torque T, and the largest amount of regenerative energy Er produced with a specific value of HSG rotation speed may be referred to as maximum regenerative energy Er_Max. The HSG rotation speed may be proportional to the rotation speed of the engine 200 connected to the HSG 110. For example, when the rotation ratio between the HSG 110 and the engine 200 is 1:1, the HSG rotation speed may be about the same as that of the engine 200, and when the rotation ratio is 1:2, the HSG rotation speed may be about half that of the engine 200.

Meanwhile, a plurality of regenerative energy maps may be provided based on the driving mode selected by the driver. In other words, in the vehicle 1 equipped with the driving system 100 according to the present exemplary embodiment, the controller 120 may be configured to set the driving style to various styles such as fuel efficiency-oriented driving style or acceleration-oriented driving style, and a plurality of regenerative energy maps may be created to correspond to the plurality of driving styles, respectively. Alternatively, the controller 120 may be configured to provide various driving modes such as fuel efficiency-oriented driving mode or acceleration-oriented driving mode, and a plurality of regenerative energy maps may be created to correspond to the plurality of driving modes, respectively. The controller 120 may be configured to identify the driving mode or the driving style before selecting a regenerative torque T, and select a regenerative torque T from the regenerative energy map that corresponds to the driving mode or driving style.

In an exemplary embodiment, the selection unit 121 may be configured to select a regenerative torque T based on the HSG rotation speed S, among all of the regenerative torque selection factors. However, unless specifically mentioned otherwise, it should be understood that a regenerative torque T may be selected either using other factors like vehicle speed, for example, apart from the HSG rotation speed S, among all of the regenerative torque selection factors, or using the HSG rotation speed S and other factors.

Figure 3:
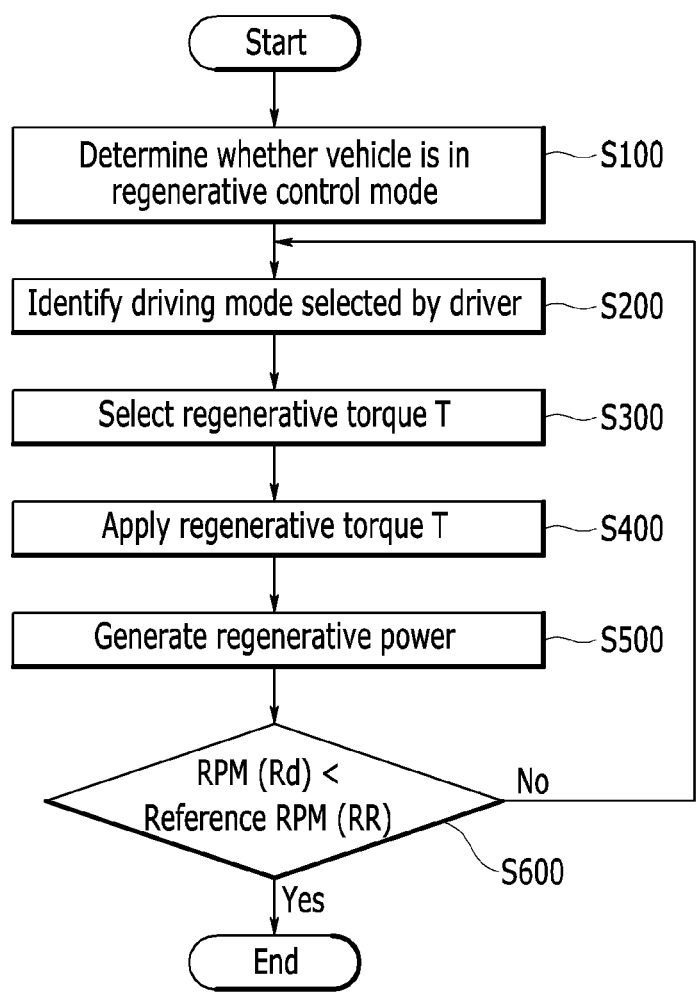
FIG. 3 is a flowchart showing a control method of the vehicle driving system of FIG. 1 according to an exemplary embodiment of the present invention.

FIG. 3 is a flowchart showing a control method of the vehicle driving system of FIG. 1. Referring to FIG. 3, the controller 120 may be configured to determine whether the vehicle 1 is currently in regenerative control mode (S100). In other words, the controller 120 may be configured to determine whether the vehicle 1 is in the regenerative control mode by determining whether the engine 200 is separated from the drive shaft 500, that is, whether the clutches 600 are disengaged.

When the vehicle 1 is currently in the regenerative control mode, the controller 120 may be configured to identify the driving mode selected by the driver or the driving style (S200). Further, the controller 120 may be configured to select a regenerative torque T from the regenerative energy map that corresponds to the driving mode or driving style (S300). In other words, the selection unit 121 may be configured to select the regenerative torque T with which maximum regenerative energy Er is produced, from the regenerative energy map, based on the HSG rotation speed.

Furthermore, the controller 120 may be configured to apply the selected regenerative torque T to the HSG 110 (S400), and the HSG 110 connected to the engine 200 may be configured to generate electric power based on the applied regenerative torque T (S500). In other words, the controller 120 may be configured to calculate the proper or appropriate amount of current that enables the regenerative torque T to be applied to the HSG 110, and apply the calculated amount of current to the HSG 110. The controller 120 may then be configured to compare the RPM (Rd) of the engine 200 or HSG 110 with a reference RPM (Rr) (S600), and cease the operation when the RPM (Rd) of the engine 200 or HSG 110 is less than the reference RPM (Rr). When the RPM (Rd) of the engine 200 or HSG 110 is less than the reference RPM (Rr), the amount of electric power generation may be less compared to the amount of current applied to the HSG 110 to apply the regenerative torque T. Accordingly, current may no longer be applied to the HSG 110.

When the RPM (Rd) of the engine 200 or HSG 110 is greater than the reference RPM (Rr), the controller 120 may be configured to repeat the driving mode identification step S200, the regenerative torque selection step S300, and the regenerative torque application step S400. In particular, the RPMs of the engine 200 and HSG 110 may be decreased by the regenerative power generation of the driving system 100. Accordingly, when repeating the step S300, the controller 120 may be configured to select a regenerative torque T that matches or corresponds to the current HSG rotation speed and apply the selected regenerative torque T to the HSG 110.

In other words, when the RPM (Rd) of the HSG 110 that generates electric power with a preset first regenerative torque T1 is decreased, a second regenerative torque T2 may be selected based on the decreased RPM (Rd) and applied to the HSG 110. Accordingly, when the second regenerative torque T2 is applied to the HSG 110 that generates electric power with the first regenerative torque T1, the controller 120 may be configured to linearly change the regenerative torque T of the HSG 110 from the first regenerative torque T1 to the second regenerative torque T2. As the regenerative torque T of the HSG 110 changes linearly, slip or damage of the belt unit 140 connecting the HSG 110 and the engine 200 may be avoided.

According to the exemplary embodiment of the present invention, energy efficiency may be optimized by generating electric power using the inertia of the engine 200, selecting the regenerative torque that enables the HSG to produce maximum energy, and applying it to the HSG.

Figure 4:
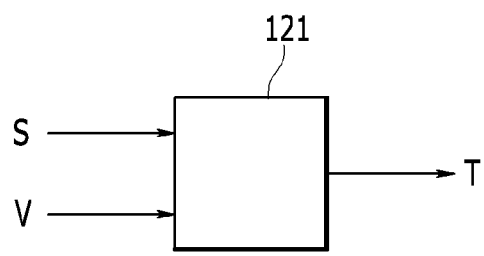
FIG. 4 is a view showing a process of generating a hybrid starter generator torque in a vehicle driving system according to another exemplary embodiment of the present invention.

FIG. 4 is a view showing a process of generating a hybrid starter generator torque in a vehicle driving system according to another exemplary embodiment of the present invention. The present exemplary embodiment is the same as the control method of FIGS. 1 to 3 according to the above-explained exemplary embodiment, except for the selection of a regenerative torque T by the selection unit 121. Accordingly, the following description will be focused on distinctive characteristics of the present exemplary embodiment. Referring to FIG. 4, the selection unit 121 of the controller 120 according to the present exemplary embodiment may be configured to select a regenerative torque T based on the HSG rotation speed S and the speed V of the vehicle 1.

In other words, the regenerative torque T at which maximum regenerative energy Er is produced may be selected based on two factors, i.e., the HSG rotation speed S and the speed V of the vehicle 1, among the above regenerative torque selection factors. The maximum amount of regenerative energy Er based on the HSG rotation speed S is substantially the same as in the above-explained FIGS. 1 to 3. The regenerative energy map may be created in which the regenerative torque T increases as the speed V of the vehicle 1 increases since as the speed of the vehicle 1 increases, the passenger becomes less sensitive to noise due to external noise such as wind noise, and a greater amount of regenerative torque T is required to stop the engine 200 more rapidly.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

1: vehicle
100: vehicle driving system
110: HSG
120: controller
130: drive motor
200: engine
300: battery
400: inverter
500: drive shaft
600: clutch

What is claimed is:

1. A hybrid vehicle control method, the vehicle comprising a drive motor and an engine as power sources and a hybrid starter generator connected to the engine to start the engine or generate electric power by the inertia of the engine, the method comprising:
   determining, by a controller, whether the vehicle is in a regenerative control mode;
   selecting, by the controller, a regenerative torque for the hybrid starter generator connected to the engine;
   applying, by the controller, the selected regenerative torque to the hybrid starter generator; and
   generating, by the controller, electric power with the regenerative torque selected by the hybrid starter generator,
   wherein, in the regenerative torque selection, the regenerative torque with which maximum regenerative energy is produced is selected based on regenerative torque selection factors including a hybrid starter generator rotation speed,
   wherein the regenerative torque selection is performed based on at least one regenerative energy map with the regenerative torque selected based on the regenerative torque selection factors.

2. The vehicle control method of claim 1, wherein the regenerative torque selection factors further include vehicle speed, and the regenerative torque is selected based on the hybrid starter generator rotation speed and the vehicle speed.

3. The vehicle control method of claim 2, wherein the regenerative torque increases as the vehicle speed increases.

4. The vehicle control method of claim 1, wherein the hybrid starter generator rotation speed is proportional to the rotation speed of the engine.

5. The vehicle control method of claim 1, wherein the determination of whether the vehicle is in the regenerative control mode includes:
   determining, by the controller, whether the engine is separated from a drive shaft.

6. The vehicle control method of claim 1, wherein the vehicle control method further comprises:
   identifying, by the controller, the driving mode of the vehicle, and the regenerative torque selection is performed based on a plurality of regenerative energy maps that correspond to a plurality of driving modes.

7. The vehicle control method of claim 1, wherein the vehicle control method further comprises:
   comparing, by the controller, revolutions per minute (RPM) of the engine or hybrid starter generator with a reference RPM, and when the RPM of the engine or hybrid starter generator is greater than the reference RPM, the regenerative torque selection and the regenerative torque application are repeated.

8. The vehicle control method of claim 7, wherein the application of the regenerative torque to the hybrid starter generator includes:
   applying, by the controller, a newly selected second regenerative torque, which is different from a first regenerative torque, to the hybrid starter generator that generates electric power with the first regenerative torque; and
   changing, by the controller, the torque applied to the hybrid starter generator from the first regenerative torque to the second regenerative torque.

9. The vehicle control method of claim 8, wherein, in the changing of the regenerative torque from the first regenerative torque to the second regenerative torque, the torque applied to the hybrid starter generator changes linearly.

10. A hybrid vehicle control system, the vehicle comprising a drive motor and an engine as power sources and a hybrid starter generator connected to the engine to start the engine or generate electric power by the inertia of the engine, the system comprising:
- a memory configured to store program instructions; and
- a processor configured to execute the program instructions, the program instructions when executed configured to:
- determine whether the vehicle is in a regenerative control mode;
- select a regenerative torque for the hybrid starter generator connected to the engine;
- apply the selected regenerative torque to the hybrid starter generator; and
- generate electric power with the regenerative torque selected by the hybrid starter generator,
- wherein, in the regenerative torque selection, the regenerative torque with which maximum regenerative energy is produced is selected based on regenerative torque selection factors including a hybrid starter generator rotation speed,
- wherein the regenerative torque selection is performed based on at least one regenerative energy map with the regenerative torque selected based on the regenerative torque selection factors.

11. The vehicle control system of claim 10, wherein the program instructions when executed that determine whether the vehicle is in the regenerative control mode are further configured to:
- determine whether the engine is separated from a drive shaft.

12. The vehicle control system of claim 10, wherein the regenerative torque selection factors further include vehicle speed, and the regenerative torque is selected based on the hybrid starter generator rotation speed and the vehicle speed.

13. The vehicle control system of claim 12, wherein the regenerative torque increases as the vehicle speed increases.

14. The vehicle control system of claim 10, wherein the hybrid starter generator rotation speed is proportional to the rotation speed of the engine.

15. The vehicle control system of claim 10, wherein the program instructions when executed are further configured to:
- identify the driving mode of the vehicle, and the regenerative torque selection is performed based on a plurality of regenerative energy maps that correspond to a plurality of driving modes.

16. The vehicle control system of claim 10, wherein the program instructions when executed are further configured to:
- compare revolutions per minute (RPM) of the engine or hybrid starter generator with a reference RPM, and when the RPM of the engine or hybrid starter generator is greater than the reference RPM, the regenerative torque selection and the regenerative torque application are repeated.

17. The vehicle control system of claim 16, wherein the program instructions when executed are further configured to:
- apply a newly selected second regenerative torque, which is different from a first regenerative torque, to the hybrid starter generator that generates electric power with the first regenerative torque; and
- change the torque applied to the hybrid starter generator from the first regenerative torque to the second regenerative torque.

18. The vehicle control system of claim 17, wherein, in the changing of the regenerative torque from the first regenerative torque to the second regenerative torque, the torque applied to the hybrid starter generator changes linearly.

* * * * *